INVENTOR.
WILLARD E. BUCK

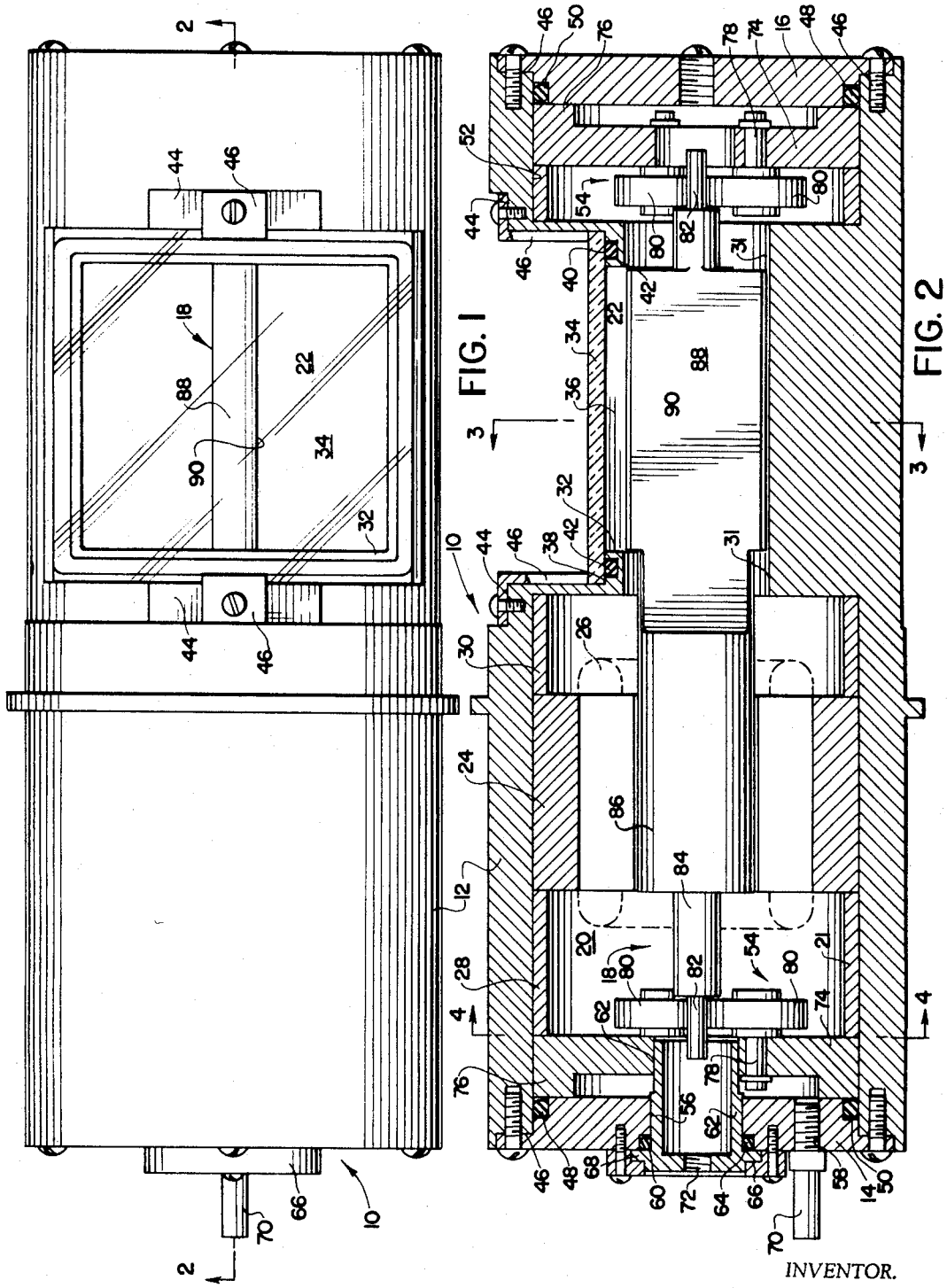

INVENTOR.
WILLARD E. BUCK
BY 3,400,285
HYSTERESIS SYNCHRONOUS MOTOR AND IMPROVED SHAFT SUB-ASSEMBLY THEREFOR
Willard E. Buck, P.O. Box 418,
Saratoga, Calif. 95070
Filed Dec. 20, 1965, Ser. No. 515,060
15 Claims. (Cl. 310—90)

This invention relates to electric motors and, more particularly, to a highly specialized hysteresis synchronous motor and rotor shaft subassembly for use therein.

Hysteresis synchronous motors are well known for the precise speed regulation that they produce. This characteristic alone makes them the overwhelming choice for use as the capstan and reel drives in fine tape recording equipment to say nothing of the multitude of less well-known applications found in industry.

Recent advances in space-age technology have developed a critical need for an electric motor drive capable of producing the precise speed regulation found in a hysteresis synchronous motor but at speeds many times greater than the prior art motors of this type are capable of operating. An even greater problem than increasing the speed without sacrificing precise control thereover, however, is to transfer these high rotational speeds to a driven element. The conventional drive or power trains have proven to be completely unworkable at speeds upwardly of five hundred revolutions per second (r.p.s.), the latter being about the lower limit at which these units must operate in certain applications.

By way of specific example, a number of photographic satellites now orbit the earth taking pictures continuously during their entire orbital excursion which usually takes about an hour and a half. At the conclusion of each orbit, all of the photographic data obtained must be transmitted back to the ground control station in a small fraction of the interval required to gather this same data. Generally speaking, the satellite will be within range of its ground control station for only five minutes or so and during this extremely short interval it must transmit all of the photographic information taken during the previous hour to two hour orbit. Obviously, such a situation demands the use of extremely high-speed transmitting and receiving equipment that is synchronized almost perfectly. Any data which the equipment fails to transmit back to its ground control station during the brief interval available for this purpose is, of course, lost once it commences its picture-taking sequence again.

The details of the complex optical and electronic apparatus, including a laser to produce the fine definition and resolution necessary to reconstruct the photographed image back at the ground-control station, form the subject matter of co-pending applications and, for this reason, need not be described in detail herein as the instant application is restricted to the hysteresis synchronous rotor shaft assembly that is used in conjunction with the above to drive one or more mirrors at rotational speeds in excess of 500 r.p.s. up to approximately 10,000 r.p.s. These exceedingly fast plane polished mirror surfaces receive a finely-focused light beam of rapidly varying intensity in accordance with a radio signal transmitted thereto from the orbiting satellite and reflect same onto a photographic film.

Now, synchronous electric motors are known in the art capable of turning these reflecting surfaces at speeds of about 30,000 r.p.m. (500 r.p.s.) but many applications, such as the one mentioned previously, require speeds from two to twenty times faster than this. On the other hand, certain types of high-speed mirror drives like, for example, helium-powered turbines are capable of achieving the necessary rotational speeds but are useless for receiving photographic data from a satellite for the simple reason that their speed cannot be controlled precisely enough to synchronize with the incoming radio transmissions.

The answer to this enigma would seem to lie in the direction of an electric motor drive, the speed of which was responsive to the frequency of the incoming radio signals yet which would be capable of turning the mirrors at rotational speeds as much as twenty times faster than the known electric motors were able to do. The design and construction of such an electric motor proved to present a number of unexpected problems for which the prior art offered no solution. For example, the horsepower requirements for an electric motor running at these speeds was found to be excessive. Conventional bearings for the rotor shaft were incapable of carrying the loads near the maximum operational limits of 10,000 r.p.s. Most troublesome, however, was the fact that no drive train was found which could transfer the high rotational speeds of the motor to the mirrors.

It has now been found in accordance with the teaching of the instant invention that the necessary rotor speeds can, in fact, be achieved in a hysteresis synchronous motor by evacuating the motor housing or at least that portion of the motor housing containing the mirror. When this is done, the power requirements are reduced to a small fraction of that which would be required to achieve the same rotational speeds with the mirror turning in air.

The bearing problem existing at the upper operational limits was ultimately solved by turning down the ends of the rotor shaft to a small diameter and then journalling these endsections within the outer races of three rather large diameter ball bearing assemblies whose inner races turned on stub shafts fastened to the endplates at the apices of an equilateral triangle. In so doing, the bearings had only to turn at speeds a small fraction of the speed at which the rotor shaft turned, such speeds lying well within their design capabilities.

As for a workable drive train, none was ever found and the unexpected solution proved to be elimination thereof altogether and mounting of the mirror or mirrors directly on the hysteresis synchronous motor's rotor shaft in close-coupled relation to the rotor element.

It is, therefore, the principal object of the present invention to provide a novel and improved hysteresis synchronous motor capable of rotor shaft speeds approaching 10,000 r.p.s.

A second objective is the provision of an electric motor of the type aforementioned that includes a sealed housing that can be evacuated to substantially eliminate air friction and thus materially lessen the power requirements necessary to achieve a given speed.

Another object of the invention herein disclosed and claimed is to provide a frequency-responsive electric mirror drive capable of precise speed regulation in synchronization with an input electrical signal.

Still another objective in the invention is the provision of a rotor shaft subassembly for use in an evacuated hysteresis synchronous motor that includes a rotor element and one or more mirrors mounted on a common shaft in close-coupled relation.

An additional objective of the invention described and claimed herein is to provide a novel high-speed synchronous motor equipped with antifriction bearings journalling the rotor shaft which, due to their design and arrangement, cooperate with a specially designed shaft and evacuated motor housing to enable extremely high rotational speeds to be realized.

Further objectives are to provide a hysteresis synchronous motor that is reliable, compact, easy to service, rugged, efficient and decorative in appearance.

Other objects will be in part apparent and in part pointed out specifically hereinafter in connection with the description of the drawings that follows, and in which:

FIGURE 1 is a top plan view of the improved high-speed hysteresis synchronous motor of the present invention;

FIGURE 2 is a diametrical section taken along line 2—2 of FIGURE 1;

Figure 3:
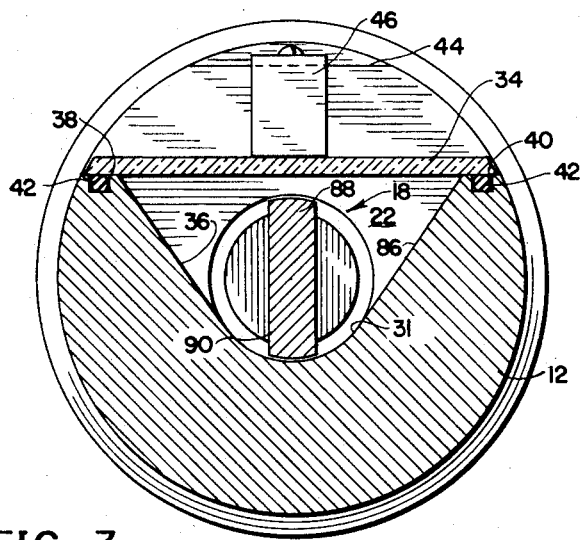
FIGURE 3 is a transverse section taken along line 3—3 of FIGURE 2 showing the evacuated mirror cavity.

Referring now to the drawings for a detailed description of the present invention and, initially to FIGURES 1 and 2 for this purpose, reference numeral 10 has been employed to designate the hysteresis synchronous motor in its entirety which will be seen to include a hollow cylindrical housing 12 fitted with endplates 14 and 16 within which is journalled for rotation a rotor shaft subassembly that has been designated in a general way by reference numeral 18. The interior of the motor housing 12 is divided into a motor cavity 20 and a mirror cavity 22 which are arranged in axially-aligned communicating relation to one another.

Motor cavity 20 comprises a large diameter bore 21 within which is mounted the stationary armature consisting of a core 24 and field winding 26 which cooperate with one another upon excitation by an AC power source to produce a revolving field or flux in the conventional manner. The armature is held in place within the motor cavity by a pair of sleeves 28 and 30.

Mirror cavity 22 has a considerably smaller diameter bore 31 than the motor cavity 20 and, in the particular form shown in FIGURES 1–4, inclusive, it also includes a recessed opening 32 covered by a transparent window 34. Bore 31 is cylindrical at its opposite extremities but, in the area encompassed by window 34 it is widened out to produce a generally V-shaped depression 36 that is clearly revealed in FIGURE 3. Material removal from the wall of the housing is done in such a manner as to leave a continuous rectangular planar ledge 38 upon which the window 34 rests. This ledge also contains an upwardly-opening groove 40 within which is mounted a resilient sealing element 42. A pair of flats are machined on the cylindrical housing surface adjacent the opening in the mirror cavity and L-shaped brackets 46 fasten thereto in position to press against the side edges of the window and urge the latter into sealed contact with the sealing element or gasket 42.

As previously mentioned, endplate 14 provides the closure for the left end of the motor cavity and endplate 16 closes the right end of the mirror cavity. Both of these endplates bolt onto their respective ends of the hollow cylindrical housing element 12 and, in the particular form shown in FIGURE 2, a step-cut joint 46 is employed of a type well known in the art. The inner face of these endplates 14 and 16 is provided with an annular step 48 which cooperates with the adjacent cylindrical wall surface of the housing element 12 to form a groove adapted to receive O-ring gasket 50. Adjacent the right endplate 16, the interior dimension of housing 12 is enlarged to approximately the same diameter as motor cavity 21 thus producing a chamber 52 sized to accept the shaft bearing subassembly that has been designated in a general way by reference numeral 54.

With particular reference to FIGURE 2, it will be seen that left endplate 14 differs structurally from right endplate 16 in that it contains a larger central opening 56, one or more eccentrically-located passages 58 and a step 60 bordering central opening 56 which cooperates with externally-flanged cup 62 that fits into said opening to form an annular passage for the reception of O-ring seal 64. Cup-shaped element 62 is fastened in place on the endplate 14 by step-cut ring 66 that engages the flange 68 of said element. Openings 58 are provided as needed to enable the various electrical leads and instrumentation to be connected into the housing. Connector 70 is of a well-known type adapted to pass such leads and seal them so as to preserve the vacuum inside the housing. The vacuum may be drawn through one of the ports 58 or through the central opening 72 in the cup-shaped element.

Figure 4:
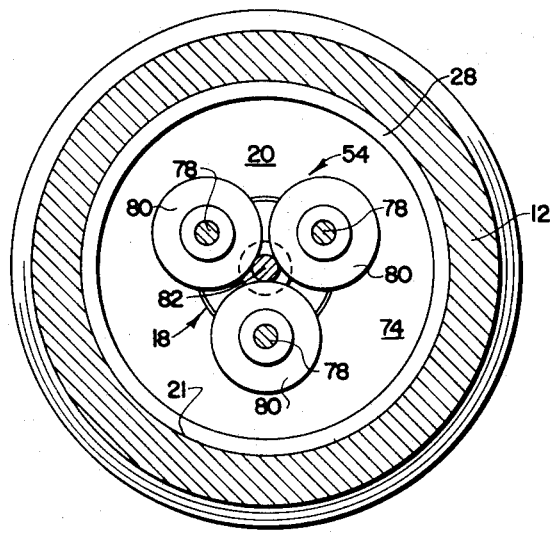
FIGURE 4 is a transverse section taken along line 4—4 of FIGURE 2 showing the improved journal for the rotor shaft.

The shaft bearing subassemblies 54 are most clearly revealed in FIGURES 2 and 4 and they will each be seen to include a centrally-apertured circular mounting plate 74 having a peripheral flange 76 that abuts the inner face of the adjacent endplate. Mounted in plate 74 are three stub shafts 78 whose axes are parallel to one another and lie at the apices of an equilateral triangle. Ball bearings 80 are journalled on these stub shafts and the combined radii of their outer races are less than the spacing between the stub shaft axes so as to accommodate the journals 82 at the ends of main shaft 84. With the main shaft journals a small fraction of the diameter of the outer bearing races that support same for rotational movement, the bearings need only turn at ordinary speeds while the main shaft is rotating at speeds up to 10,000 r.p.s.

Next, with particular reference to FIGURES 1, 2 and 4, it will be noted that the main shaft subassembly 18 includes as an integral part thereof the rotor or field magnet 86 of the hysteresis synchronous motor and a mirror 88 located adjacent thereto. Rotor 86 is cylindrical and turns within the field winding 26 in response to the rotating field developed therein. Mirror 88, in the particular form shown, is machined as an integral part of the shaft and provides a pair of plane polished reflecting surfaces 90 lying in spaced parallel relation to one another equidistant on opposite sides of the axis of rotation. Rotor 66 must be formed of some magnetic material in order to respond to the rotating field generated in the field coil 26. Thus, with an integral construction like the one illustrated, the mirror 88, main shaft 84 and journals 82, must likewise, be of the same magnetic material. It is essential to the successful operation of the unit at speeds well above 500 r.p.s. that both the mirror 88 and rotor 86 be mounted on a common shaft 84 and that they lie closely adjacent one another in close-coupled relation. No drive train has been found that can be interposed between the rotor and mirror that will stand up under the high rotational speeds to which the shaft subassembly 18 is subjected.

In the modified form of the unit 10m shown in FIGURES 5–7, inclusive, to which reference will now be made, the main housing 12m is formed in several parts. The first of these is a generally cup-shaped element 92 having its endplate 14m integrally-formed on one extremity of hollow cylindrical wall 94. The open end of this cup-shaped housing element 92 receives the elongated core 24m and field coil 26m which are held in place by an externally-threaded lock ring 96 that screws into the bore which produces the motor cavity 20m. The core, field coil and rotor 86m of the hysteresis synchronous motor all project slightly beyond the open end of the cup-shaped element 92 in the particular form shown and these projecting portions are housed inside another element 98 of the housing that fastens into the open end of element 92 and is sealed thereagainst by O-ring 100 that encircles the joint therebetween.

Element 98 of the housing has a detachable endplate 16m that bolts thereto and mounts ball bearing 102 within a shock-absorbent O-ring 104. Element 98 is essentially tubular and forms the mirror cavity 22m which is only slightly smaller in diameter than the motor cavity 20m. As seen most clearly in FIGURE 6, approximately one-third of the cylindrical wall 106 of element 98 is removed thus exposing the mirror cavity 22m and the two triangular mirrors 88m housed therein. A shoulder 108 encircles the housing element 98 and cooperates with a groove 110 containing an O-ring 112 to seal the motor housing within an opening 114 provided for the purpose in air-tight enclosure 116. Only a small portion of one wall of enclosure 116 is shown because of space limitations, however, it should suffice to say that this enclosure seals off the open mirror and motor cavities 20m and 22m from the atmosphere so that they can be evacuated. This enclosure also houses some of the electronic and optical equipment which produces the images on the mirrors that is reflected thereby onto the recording medium.

Figure 5:
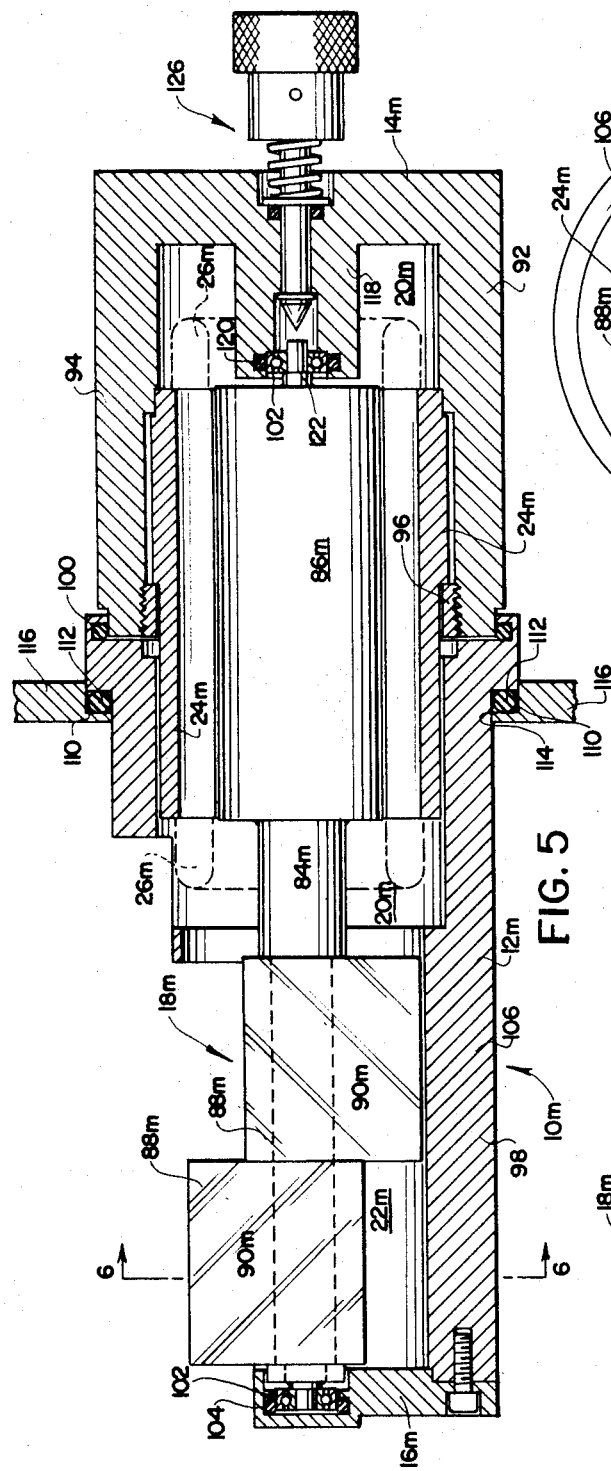
FIGURE 5 is a diametrical section similar to FIGURE 2, portions of the housing having been broken away to conserve space, showing a modified version of the motor equipped with two mirrors and a different shaft journal.
Figure 7:
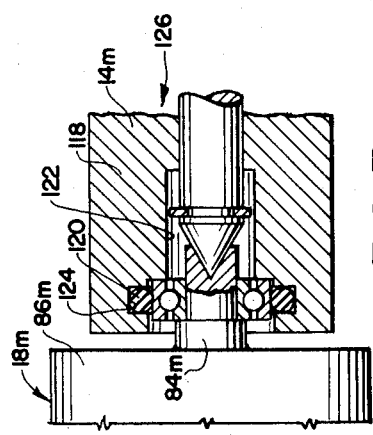
FIGURE 7 is a fragmentary detail to an enlarged scale, portions of which have been broken away to reveal the interior construction, showing the manual control for turning the rotor shaft.

In FIGURES 5 and 7, it will be noted that the cup-shaped element 92 contains a centrally-located integral projection 118 on the inside surface of endwall 14m that carries the other ball bearing 102 similarly mounted within O-ring 120. The ball bearing is placed within a cylindrical depression 122 in the end of the depression which has an annular O-ring groove 124 surrounding same.

The aforementioned details of the housing 12m, shaft bearings 102 and armature elements 24m and 26m are but matters of mechanical design which may be varied to suit the particular requirements of the user and, for this reason, are important to the present invention only insofar as providing evacuatable adjoining motor and mirror cavities, bearings for the shaft subassembly journals, and a synchronous electrical drive for said shaft subassembly. To the same effect is the spring-biased plunger assembly 126 which is used to manually rotate the shaft subassembly from the outside of the housing.

The significant feature is the shaft subassembly 18m which as in the previously-described construction, has a rotor 86m formed of a magnetic material machined as an integral part of the main shaft. Here, however, instead of a single integrally-formed mirror 88, a pair of triangular mirrors 88m are mounted on the main shaft 84m in abutting end-to-end relation. As illustrated, both mirrors have equilateral triangular cross sections that provide three plane polished faces 90m. The axis of the triangular prisms thus formed are coincident with the main shaft but the mirrors are rotated 30° relative to one another.

The significance of this construction is that the mirrors may be made of different, even non-magnetic, materials such as, for example, titanium and beryllium or alloys thereof without effecting the properties of the motor. The small amount of distortion produced at these high rotational speeds in the plane polished surfaces of mirrors having this shape when formed from a metal such as beryllium make it highly desirable to be able to fabricate them from a material different than the rotor while retaining the advantages of a close-coupled relationship and the elimination of any mechanical drive train between the motor and mirrors. Of course, if the unit is to be driven at or near the maximum speeds, the bearing assembly of FIGURES 2 and 4 would prove more satisfactory.

Figure 6:
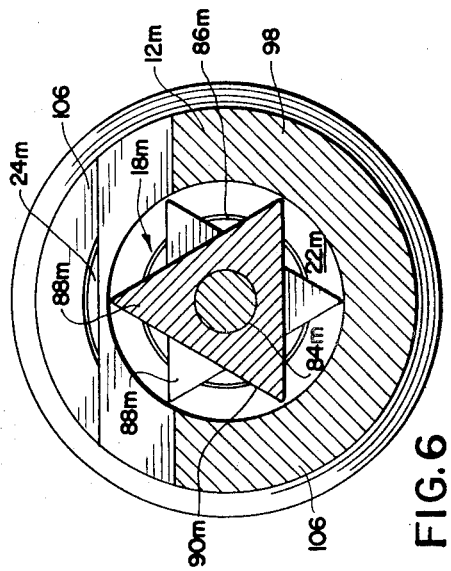
FIGURE 6 is a transverse section taken along line 6—6 of FIGURE 5 showing the mirror cavity.
Figure 8:
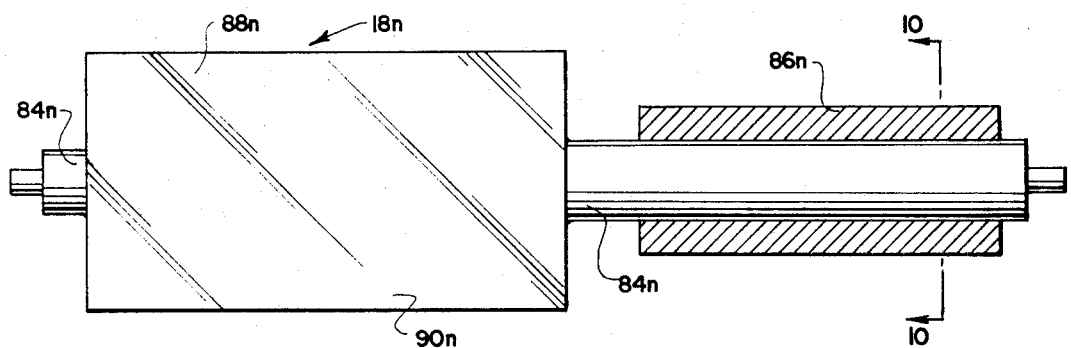
FIGURE 8 is a front elevational detail, portions of which have been broken away and shown in section to expose the interior construction, disclosing a further modified form of the shaft subassembly.
Figure 9:
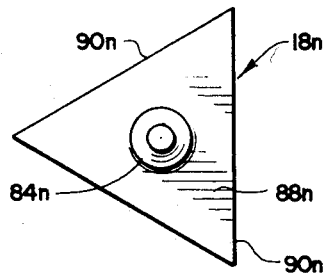
FIGURE 9 is a left end view of the FIGURE 8 modification.
Figure 10:
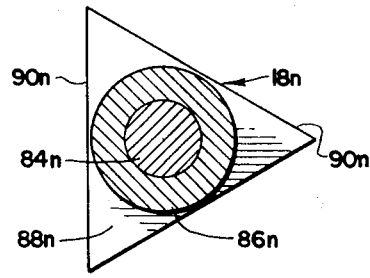
FIGURE 10 is a transverse section taken along line 10—10 of FIGURE 8.

Finally, with reference to FIGURES 8-10, inclusive, wherein the further modified shaft subassembly 18n has been illustrated, it will be seen to differ from the version shown in FIGURES 5-7, inclusive, in that a single triangular mirror 88n is machined as an integral part of the motor shaft 84n while the rotor 86n comprises a separate tubular element formed from a magnetic material and shrunk or otherwise fastened onto the motor shaft. Shaft subassembly 18n may, of course, be used in either of the motor housings previously described and with either of the shaft bearing subassemblies.

Triangular mirror 88n is identical in cross section to mirrors 88m but is slightly longer and the plane polished faces 90n thereof are spaced farther from the axis of rotation. The advantage of the subassembly 18n is that both the mirror 88n and shaft 84n can be formed from a non-magnetic material such as, for example, beryllium. This feature becomes extremely useful when the mirror needs to be larger than the motor rotor 86n because the greater stresses to which the shaft is subjected by the large mirror make the integral construction desirable and also enable the shaft to be formed from a material better able to withstand these stresses than the permanently magnetized material from which the rotor must be fabricated.

Having thus described the novel and improved hysteresis synchronous motor and shaft subassembly therefor of the present invention, it will be seen that the several worthwhile objects for which it was developed have been achieved. Although but two specific embodiments have been illustrated, I realize that certain changes and modifications therein may well occur to those skilled in the art within the broad teaching hereof; hence, it is my intention that the scope of protection afforded hereby shall be limited only insofar as specifically set forth in the appended claims.

What is claimed is:

1. An electrically-operated, high-speed rotating assembly comprising: an elongate housing having endplates at opposite ends thereof and the interior divided into a motor compartment and a mirror compartment arranged in end-to-end communicating relation, means forming a status structure for a synchronous motor mounted in the motor compartment, shaft bearings mounted in opposite ends of the housing, a unitary shaft journalled for rotation within the shaft bearings, a rotor formed of a magnetic material carried by the shaft for rotation therewith inside the stator in response to a revolving flux acting thereon, and at least one mirror having a plane polished reflecting surface carried by the shaft for rotation therewith inside the mirror compartment in close-coupled relation to the rotor.

2. The high-speed rotating assembly as set forth in claim 1 in which: at least one of said mirror and rotor elements is formed integral with the shaft.

3. The high-speed rotating assembly as set forth in claim 1 in which: the mirror is formed from a non-magnetic material selected from the group comprising beryllium and titanium.

4. The high-speed rotating assembly as set forth in claim 1 in which: the motor and mirror compartments are included as a part of an air-tight evacuatable chamber.

5. The high-speed rotating assembly as set forth in claim 1 in which: the housing is provided with an opening between said motor compartment and mirror compartment.

6. The high-speed rotating assembly as set forth in claim 1 in which: each shaft bearing comprises a set of at least thru ball bearing assemblies interiorly mounted on said end plates and grouped around the shaft journal with their outer races in tangential supporting relation thereto.

7. The high-speed rotating assembly as set forth in claim 2 in which: the shaft and mirror are formed integral with one another from a non-magnetic material and the rotor comprises a tubular permanent magnet fastened onto the shaft.

8. The high-speed rotating assembly as set forth in claim 2 in which: the shaft and rotor are formed integral with one another from a magnetic material and the mirror comprises a separate element formed from a non-magnetic material and fastened onto the shaft.

9. The improved shaft subassembly for high speed hysteresis synchronous motors having a stationary armature mounted inside an air-tight evacuatable housing which comprises: an elongate unitary shaft having one end extending into the armature and the other end projecting therebeyond, bearing means journalling opposite extremities of the shaft for high-speed rotational movement, a magnetic rotor carried by that portion of the shaft within the armature and rotatable relative thereto in response to a revolving flux produced thereby, and at least one mirror having at least one plane polished reflecting surface carried by the projecting end of the shaft for rotation therewith in close-coupled relation to the rotor.

10. The shaft subassembly as set forth in claim 9 in which: the rotor is formed as an integral part of the shaft.

11. The shaft subassembly as set forth in claim 9 in which: both the rotor and mirror comprise integral parts of the shaft.

12. The shaft subassembly as set forth in claim 9 in which: the mirror is fabricated from a non-magnetic material selected from the group comprising beryllium and titanium.

13. The shaft subassembly as set forth in claim 9 in which: each bearing means comprises a set of at least three ball bearing assemblies journalled respectively on spaced parallel end bell mounted stub shafts with their outer races in tangential supporting relation to the journals of the shaft carrying the rotor and mirror.

14. The shaft subassembly as set forth in claim 9 in which: the shaft and mirror are formed integral with one another from a non-magnetic material and the rotor comprises a tubular permanent magnet fastened onto the shaft.

15. The shaft subassembly as set forth in claim 9 in which: the shaft and rotor are formed integral with one another from a magnetic material and the mirror comprises a separate element formed from a non-magnetic material and fastened onto the shaft.

References Cited
UNITED STATES PATENTS 1,186,712    6/1916    Vandegrift _____ 310—90

MILTON O. HIRSHFIELD, *Primary Examiner.*

L. L. SMITH, *Assistant Examiner.*